United States Patent
Uraguchi et al.

(10) Patent No.: US 10,183,637 B2
(45) Date of Patent: Jan. 22, 2019

(54) BATTERY CARRIER INCLUDING A BASE MEMBER AND A CLAMP MEMBER

(71) Applicant: TOYOTA JIDOSHA KABUSHIKI KAISHA, Toyota-shi (JP)

(72) Inventors: Takashi Uraguchi, Okazaki (JP); Yoshinori Yokota, Toyota (JP)

(73) Assignee: TOYOTA JIDOSHA KABUSHIKI KAISHA, Toyota-shi (JP)

(\*) Notice: Subject to any disclaimer, the term of this patent is extended or adjusted under 35 U.S.C. 154(b) by 0 days.

(21) Appl. No.: 15/382,170

(22) Filed: Dec. 16, 2016

(65) Prior Publication Data

US 2017/0174160 A1    Jun. 22, 2017

(30) Foreign Application Priority Data

Dec. 22, 2015   (JP) .................................. 2015-249937

(51) Int. Cl.
   *H01M 2/10*   (2006.01)
   *B60R 16/04*  (2006.01)
   *B60L 11/18*  (2006.01)

(52) U.S. Cl.
   CPC .......... *B60R 16/04* (2013.01); *B60L 11/1879* (2013.01); *H01M 2/1083* (2013.01); *H01M 2220/20* (2013.01); *Y02T 10/705* (2013.01); *Y02T 10/7005* (2013.01)

(58) Field of Classification Search
   CPC .. B60R 16/04; B60L 11/1879; H01M 2/1083; H01M 2220/20; Y02T 10/705; Y02T 10/7005

USPC ......................................................... 429/100
See application file for complete search history.

(56) References Cited

U.S. PATENT DOCUMENTS

| | | | |
|---|---|---|---|
| 6,230,834 B1* | 5/2001 | Van Hout | B60R 16/04 180/68.5 |
| 2012/0025045 A1* | 2/2012 | Meier | H01M 2/1083 248/229.1 |
| 2014/0158443 A1* | 6/2014 | Lee | B60R 16/04 180/68.5 |
| 2015/0316086 A1 | 11/2015 | Urban et al. | |

FOREIGN PATENT DOCUMENTS

| | | |
|---|---|---|
| EP | 2 527 205 A1 | 11/2012 |
| JP | 2015-525328 | 9/2015 |
| JP | 2016-137653 | 8/2016 |
| JP | 2016137853 A * | 8/2016 |

\* cited by examiner

Primary Examiner — Gary D Harris
(74) Attorney, Agent, or Firm — Oblon, McClelland, Maier & Neustadt, L.L.P.

(57) ABSTRACT

A battery carrier includes a base member, a clamp member, and a bolt. The base member has a recess of a concave cylindrical shape at a portion. The clamp member includes a clamp portion that is in contact with an upper surface of a rib in a holding state, a fulcrum portion having a convex cylindrical surface, that is in contact with the recess, and a bolt hole provided at a portion between the clamp portion and the fulcrum portion. The bolt is inserted through the bolt hole in the holding state. The base member and the clamp member are configured to generate, by fastening the bolt, a clamping force with which the rib is clamped between the clamp portion and the placement surface.

10 Claims, 7 Drawing Sheets

BATTERY CARRIER INCLUDING A BASE MEMBER AND A CLAMP MEMBER

INCORPORATION BY REFERENCE

The disclosure of Japanese Patent Application No. 2015-249937 filed on Dec. 22, 2015 including the specification drawings and abstract is incorporated herein by reference in its entirety.

BACKGROUND

1. Technical Field

The disclosure relates to a battery carrier that holds a battery in a vehicle.

2. Description of Related Art

Figure 10:
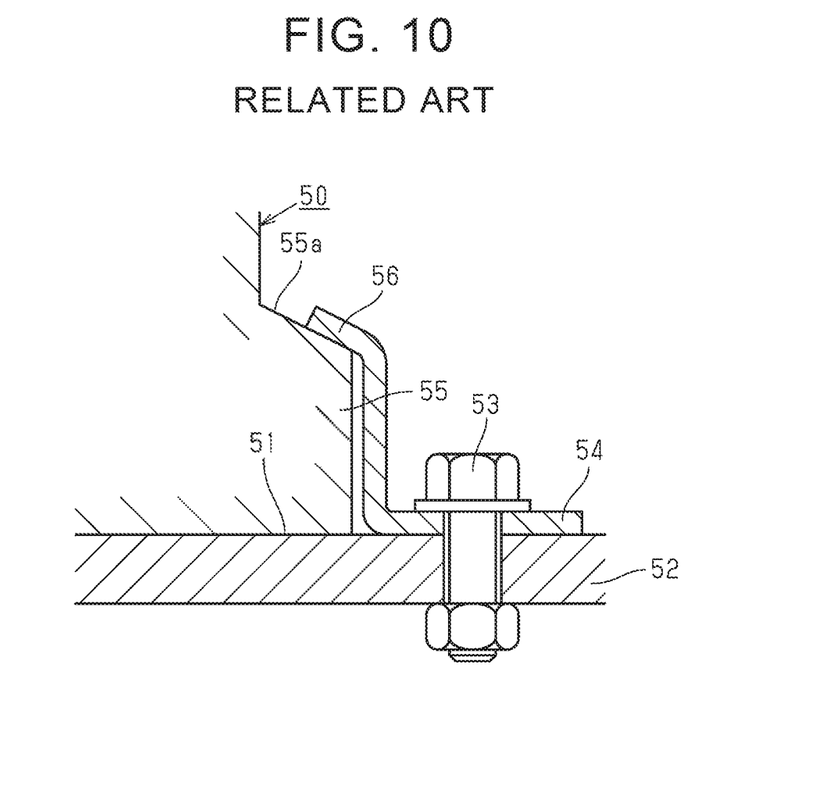
FIG. 10 is a sectional view off portion around a bracket of a battery carrier in a related art.

As a related art, there is known a battery carrier described in EP Patent No. 2527205 A1. As shown in FIG. 10, the battery carrier described in the document includes a base member 52 provided at its upper surface with a placement surface 51 on which a battery 50 is placed. A bracket 54 is fixed by a bolt 53 to a portion sideward of the placement surface 51, of the base member 52. The bracket 54 has a flange 56 that comes in contact with an upper surface 55a of a rib 55 provided at a bottom portion of the battery 50. The battery carrier thus configured bolds the battery 50 by clamping the rib 55 of the battery 50 between the flange 56 and the placement surface 51.

SUMMARY

In the meantime, holding force for holding the battery 50 in the batter carrier of the related art is determined by clamping force for clamping the rib 55 between the flange 56 and the placement surface 51. This clamping force changes by the relationship between the height from the placement surface 51 to the flange 56 (hereinafter referred to as a "flange height") and the height from a bottom surface of the battery 50 to the rib 55 thereinafter referred to as a "rib height"). That is, when the flange height is greater than the rib height, the clamping force is not generated, and, the smaller the flange height relative to the rib height, the greater the clamping force.

Incidentally, there are cases where the flange height and the rib height may differ from the design dimensions due to variation in dimensions of the batteries 50 and the brackets 54 in the manufacture. In this case, if the ratio of the flange height to the rib height is greater than the design ratio, the holding force for the battery 50 becomes insufficient.

The disclosure provides a battery carrier that can properly ensure holding force for a battery regardless of variation in dimensions of members.

A battery carrier of a first aspect is a battery carrier that holds in a vehicle a battery having a rectangular parallelepiped shape and provided with a rib at a bottom portion of a side surface of the battery, the battery carrier including: a base member having, at its upper surface, a placement surface on which the battery is placed in a holding state in which the battery carrier holds the battery, the base member having a recess of a concave cylindrical shape, the recess being provided at a portion of the upper surface located sideward of the rib in the holding state, and the recess extending in a direction parallel to an extending direction, of the rib; a clamp member that clamps, and holds the rib between the clamp member and the placement surface in the holding state, the clamp member including a clamp portion that is in contact with an upper surface of the rib in the holding state, a fulcrum portion having a convex cylindrical surface, that is in contact with the recess, as a contact surface of the clamp member with the base member in the holding state, and a bolt hole provided at a portion between the clamp portion and the fulcrum portion; and a bolt that is inserted through the bolt hole in the holding state, wherein the base member and the clamp member are configured to generate, by fastening the bolt, a clamping force with which the rib is clamped between the clamp portion and the placement surface.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A battery carrier of this embodiment holds in a vehicle a battery having a rectangular parallelepiped shape and provided with a rib at a bottom portion of a side surface of the battery. The battery may have a generally rectangular parallelepiped shape, and the rectangular parallelepiped shape herein includes an imperfect rectangular parallelepiped shape.

Herein, a state in which the battery carrier holds the battery is defined as a holding state. The battery carrier includes a base member and a clamp member. The base member has at its upper surface a placement surface on which the battery is placed in the holding state, and is provided with a recess of a concave cylindrical shape at a portion, located sideward of the rib in the holding state, of the upper surface, the recess extending in a direction parallel to the rib. The clamp member clamps and holds the rib between the clamp member and the placement surface in the holding state and includes a clamp portion that comes in contact with an upper surface of the rib in the holding state, a fulcrum portion baying a convex cylindrical surface, that comes in contact with the recess, as a contact surface of the clamp member with the base member in the holding state, and a bolt hole provided at a portion between the clamp portion and the fulcrum portion. The battery carrier further includes a bolt that is inserted through the bolt hole in the holding state, and is configured to generate, by fastening using the bolt, a clamping force for clamping the rib between the clamp portion and the placement surface.

In the battery carrier thus configured, the battery is held by clamping the rib between the placement surface of the base member and the clamp portion of the clamp member through the fastening using the bolt in a state where the convex cylindrical surface provided to the fulcrum portion of the clamp member is in contact with the recess of the concave cylindrical shape provided to the base member and where the clamp portion of the clamp member is in contact with the upper surface of the rib of the battery. Further, in this battery carrier, the fulcrum portion of the clamp member and the recess of the base member are in contact with each other at the convex and concave cylindrical surfaces, and it is possible to change the height (clamp height) from the placement surface to the clamp portion by pivoting of the clamp member about a cylinder center axis of those cylindrical surfaces.

In contrast, even when a clamp member is provided such that its fulcrum portion is fixed to a base member or even when a clamp member is provided such that its fulcrum portion and a base member come in contact with each other by surfaces other than cylindrical surfaces, the clamp height can be changed. However, the following problems arise in those cases.

Figure 11:
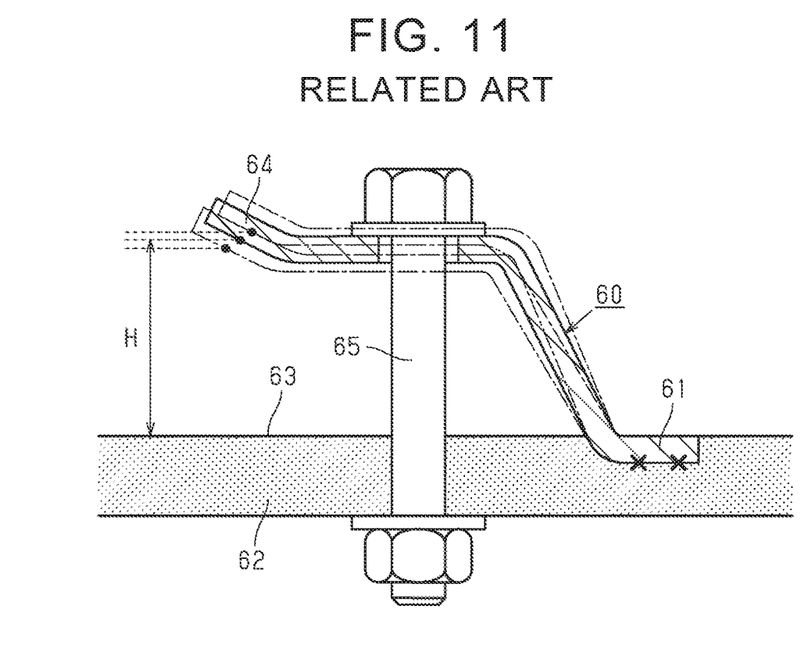
FIG. 11 is a sectional view showing a manner of changing the clamp height of a clamp member in a related art, wherein a fulcrum portion of the clamp member is fixed to a base member.

In FIG. 11 showing a related art, there is shown a manner of changing the clamp height H of a clamp member 60 that is disposed in a state where a fulcrum portion 61 is fixed to a base member 62. In this case, in order to change the clamp height H from a placement surface 63 to a clamp portion 64, it is necessary to elastically deform the clamp member 60. When the rib height of a battery is lower than expected, the clamp member 60 is already in a distorted state when the clamp portion 64 is brought into contact with an upper surface of a rib of the battery. Then, a bolt 65 is further tightened from that state to generate clamping force for the rib, so that the distortion of the clamp member 60 further increases.

In this way, when the change in the clamp height causes the elastic deformation of the clamp member, the distortion of the clamp member becomes large in a battery holding state. Therefore, creep deformation is likely to occur in the clamp member. Further, the surface pressure that is applied to a contact surface, with the fulcrum portion, of the base member also becomes large, so that creep deformation is likely to occur also in the contact surface. By such plastic deformation, the clamping force for the rib that is generated by tightening of the bolt and thus the holding force for the battery will decrease with time.

Figure 12:
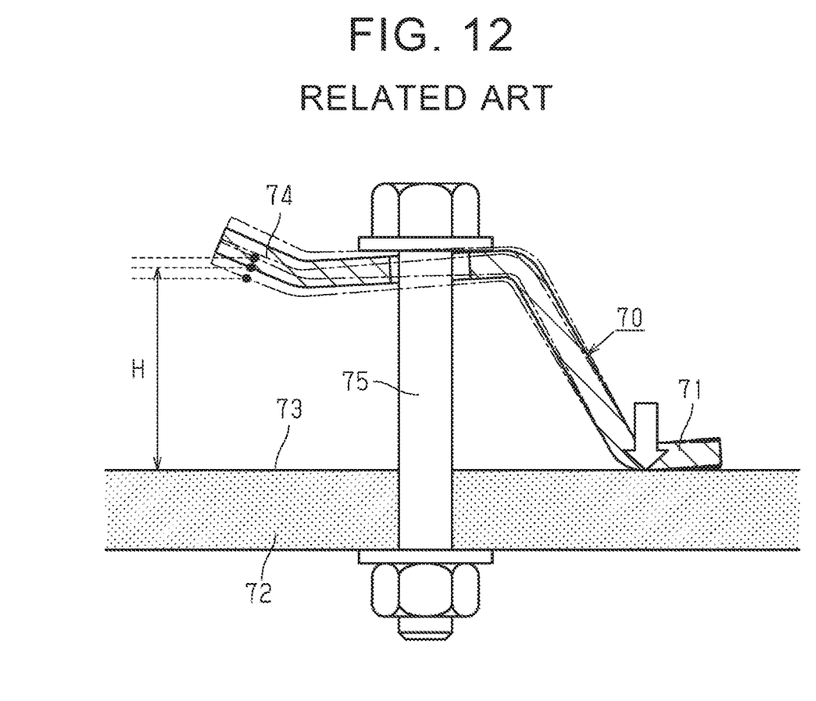
FIG. 12 is a sectional view showing a manner of changing the clamp height of a clamp member in a related art, wherein contact surfaces between a fulcrum portion of the clamp member and a base member are flat surfaces.

On the other hand, in FIG. 12 showing a related art, there is shown a manner of changing the clamp height H of a clamp member 70 that is disposed in a state where a fulcrum portion 71 is in contact with a base member 72 by flat surfaces. In this case, since the clamp member 70 is not fixed to the base member 72, the clamp height H from a placement surface 73 to a clamp portion 74 can be changed without causing elastic deformation of the clamp member 70. However, the change in the clamp height H in this event is achieved by inclination of the entire clamp member 70.

When the clamp member 70 is inclined, the fulcrum portion 71 is inclined relative to an upper surface of the base member 72, so that the contact area between the fulcrum portion 71 and the base member 72 decreases.

On the other hand, when a bolt 75 is tightened to generate clamping force for a rib by the clamp portion 74, pressing force for the fulcrum portion 71 against the base member 72 is also generated simultaneously. When the contact area between the fulcrum portion 71 and the base member 72 decreases, the surface pressure that is applied to the base member 72 due to the pressing from the fulcrum portion 71 in this event increases, so that creep deformation is likely to occur in the base member 72. Therefore, also in the case where the change in the clamp height causes the change in the contact area between the fulcrum portion and the base member, there is a possibility of promoting a decrease with time in the holding force for a battery.

In this regard, in the battery carrier of this embodiment, the contact surfaces between the base member and the clamp member are the concave and convex cylindrical surfaces having the same curvature, and it is possible to change the clamp height by pivoting of the clamp member about the cylinder center axis of those cylindrical surfaces. The pivoting of the clamp member in this event is carried out while maintaining contact between the concave and convex cylindrical surfaces without causing a change in the contact area therebetween. Further, it does not cause elastic deformation of the clamp member. Therefore, in this battery carrier, it is possible to change the clamp height without causing the distortion of the clamp member or an increase in the surface pressure that is applied to the base member, which otherwise promotes a decrease with time in the holding force. Therefore, it is possible to properly ensure the holding force for the battery regardless of variation in dimensions of the members.

In the battery carrier of this embodiment, if the holding force for the battery is made greater, the surface pressure that is applied to the recess, serving as a support surface for the fulcrum portion, of the base member increases correspondingly, so that the creep deformation as described above is likely to occur. In this regard, if a portion, where the placement surface is provided, of the base member is made of a resin having a lower specific gravity than a metal, and a portion, where the recess is provided, of the base member is made of a metal having a higher creep resistance than a resin, it is possible to increase the battery holding force while suppressing an increase in the weight of the battery carrier.

In the battery carrier of this embodiment, it is considered that, in the holding state, the battery is placed on the placement surface such that the position, on the placement surface, of a side surface, opposite to the side surface where the rib is provided, of the battery is located at a prescribed position. In this case, if the size of the battery is changed, the position, on the placement surface, of the rib that is clamped by the clamp member also changes. Even in such a case, if a plurality of recesses are provided in the upper surface of the base member at positions with different distances from the prescribed position, it is possible to change the attaching position of the clamp member according to the size of the battery, so that it is possible to hold a plurality of kinds of batteries of different sizes by the same battery carrier.

If the clamp member of the battery carrier is in the form of a plate member that is curved in a semi-cylindrical shape at the fulcrum portion, the clamp member can be easily manufactured by press working or the like.

Hereinbelow, an embodiment of a battery carrier will be described in detail with reference to FIGS. 1 to 9. In the following description, directions indicated by arrows FR, BK, RH, LH, UP, and DW in the figures are respectively defined as forward, backward, rightward, leftward, upward, and downward directions of the battery carrier and a battery that is held by the battery carrier.

Figure 1:
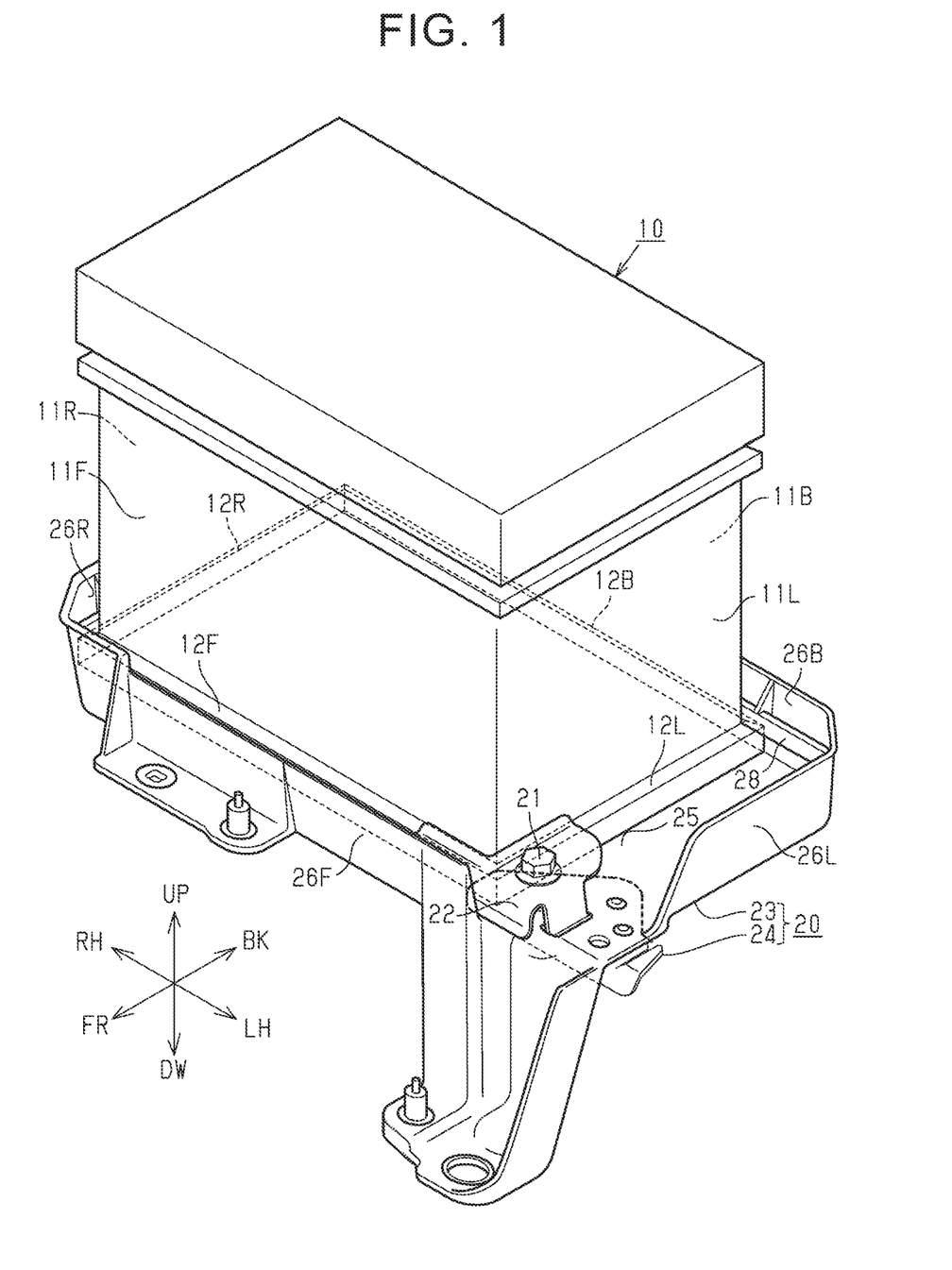
FIG. 1 is a perspective view showing a battery carrier of an embodiment in a state where the battery carrier holds a battery.

As shown in FIG. 1, a battery 10 that is held by the battery carrier of this embodiment has a generally rectangular parallelepiped shape having four side surfaces, i.e. a front side surface 11F, a back side surface 11B, a right side surface 11R, and a left side surface 11L. The battery 10 has ribs 12F, 12B, 12R, and 12L protruding outward (sideward of the battery 10) and respectively provided at bottom portions of the four side surfaces (11F, 11B, 11R, 11L). Upper surfaces of the ribs 12F, 12B, 12R, and 12L are each inclined downward as it extends outward.

The battery carrier of this embodiment is configured to be able to hold either one of two kinds of batteries 10 of different sizes. These two kinds of the batteries 10 have different widths in the left-right direction, but the same width in the front-back direction. Hereinbelow, of these two kinds of the batteries, the battery with the smaller width in the left-right direction will be referred to as a "small-size battery", while the battery with the greater width in the left-right direction will be referred to as a "large sire battery". Incidentally, the battery 10 shown in FIG. 1 is the small-size battery.

The battery carrier of this embodiment includes a bottomed box-shaped base member 20 that covers a bottom portion of the battery 10, and a clamp member 22 that is fixed to a left-from side portion of the base member 20 by a holt 21. The base member 20 is composed of a resin body 23 and a metal bracket 24.

The body 23 of the base member 20 has at its upper surface a placement surface 25 on which the battery 10 is placed. Further, the body 23 of the base member 20 has four side walls extending upward from the upper surface of the body 23. The four side walls respectively face the four side surfaces of the battery 10 and surround the placement surface 25. That is, the body 23 has a front side wall 26F that faces the front side surface 11F of the battery 10, a back side wall 26B that faces the back side surface 11B of the battery 10, a right side wall 26R that faces the right side surface 11R of the battery 10, and a left side wall 26L that faces the left side surface 11L of the battery 10.

The front side wall 26F and the right side wall 26R, are continuous with each other, the right side wall 26R and the back side wall 26B are continuous with each other, and the back side wall 26B and the left side wall 26L are continuous with each other, while the left side wall 26L and the front side wall 26F are not continuous with each other such that there is no side wall at the left-front side portion of the base member 20. With this configuration, it is prevented that the side wall gets in the way when fixing the clamp member 22 to the base member 20.

Figure 2:
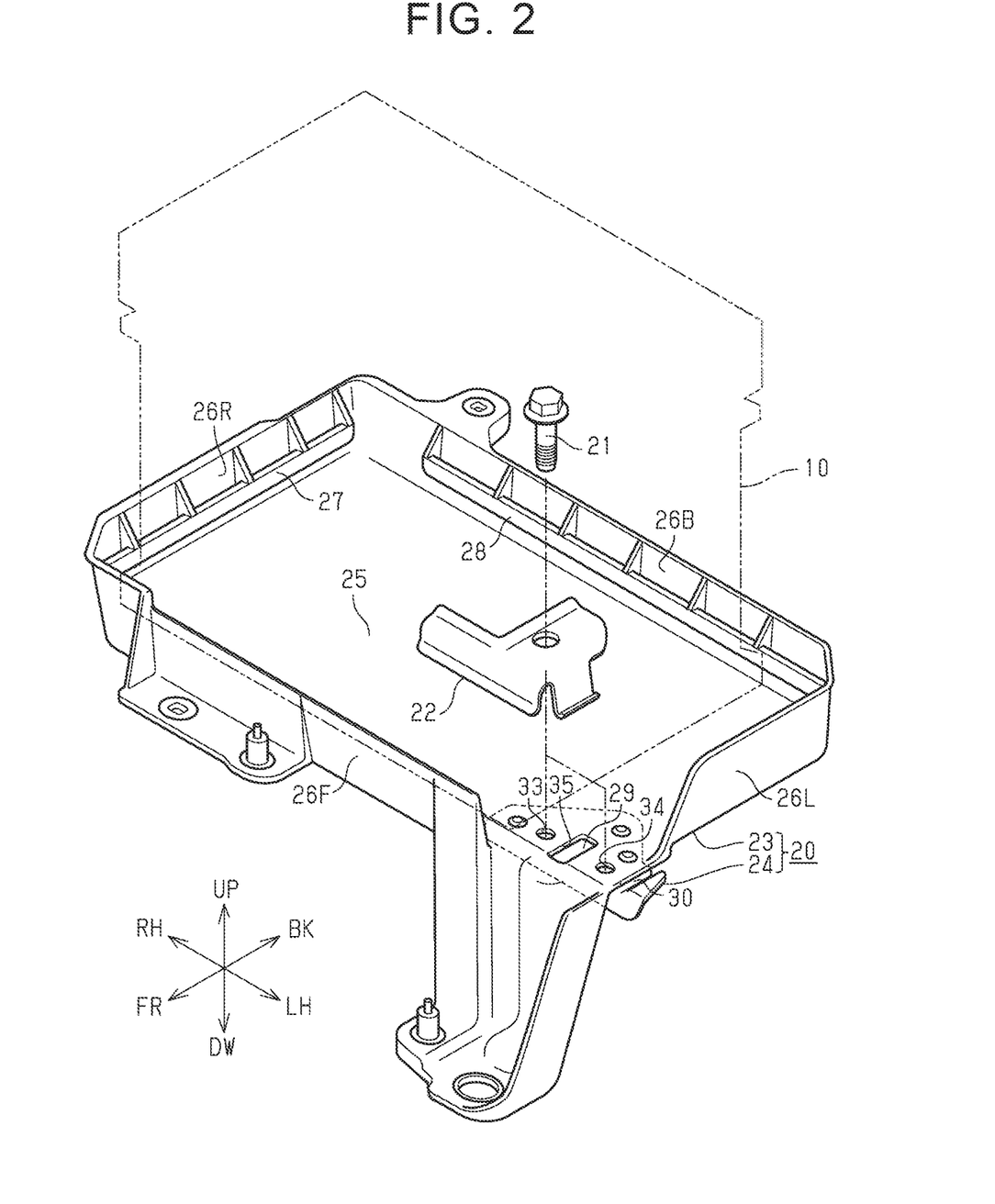
FIG. 2 is an exploded perspective view of the battery carrier.

FIG. 2 shows an exploded perspective structure of the battery carrier of this embodiment. The battery 10 indicated by a two-dot chain line in FIG. 2 is the small-size battery. As shown in FIG. 2, locking portions 27 and 28 protruding to the battery 10 side are respectively provided to the right side wall 26R and the back side well 26B, i.e. the two of the four side walls of the body 23 of the base member 20. In the state where the battery carrier of this embodiment bolds the battery 10 (hereinafter referred to as a "holding state"), the upper surface of the rib 12R of the right side surface 11R of the battery 10 is in abutment with a lower surface of the locking portion 27 of the right side wall 26R. Further, in the holding state, the upper surface of the rib 12B of the back side surface 11B of the battery 10 is in abutment with a lower surface of the locking portion 28 of the back side wall 26B.

On the other hand, the metal bracket 24 is attached to the left-front side portion of the base member 20 in a state where a portion of the bracket 24 protrudes leftward from the body 23. The bracket 24 is fixed to a lower surface of the body 23. The fixing of the bracket 24 to the body 23 is carried out by, for example, rivets.

Figure 3:
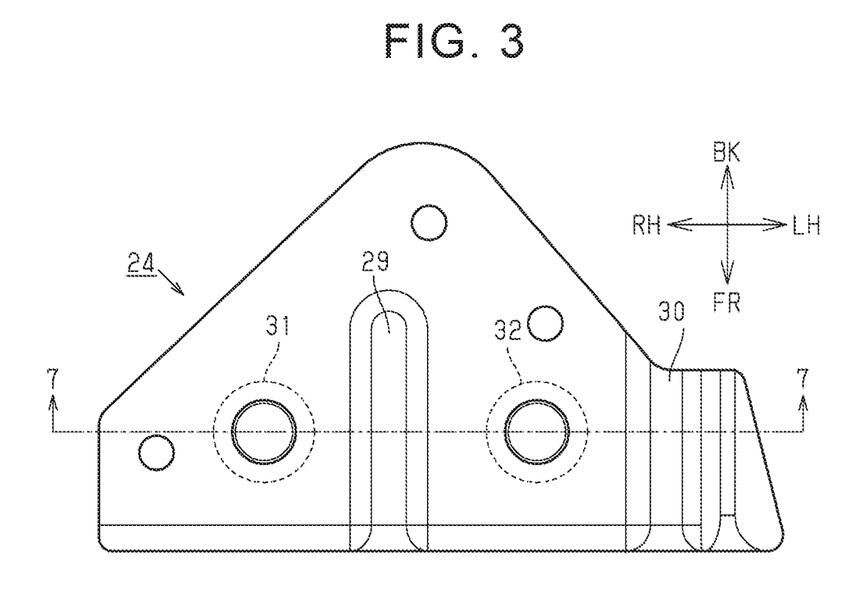
FIG. 3 is a plan view of a bracket as a constituent member of the battery carrier.
Figure 4:
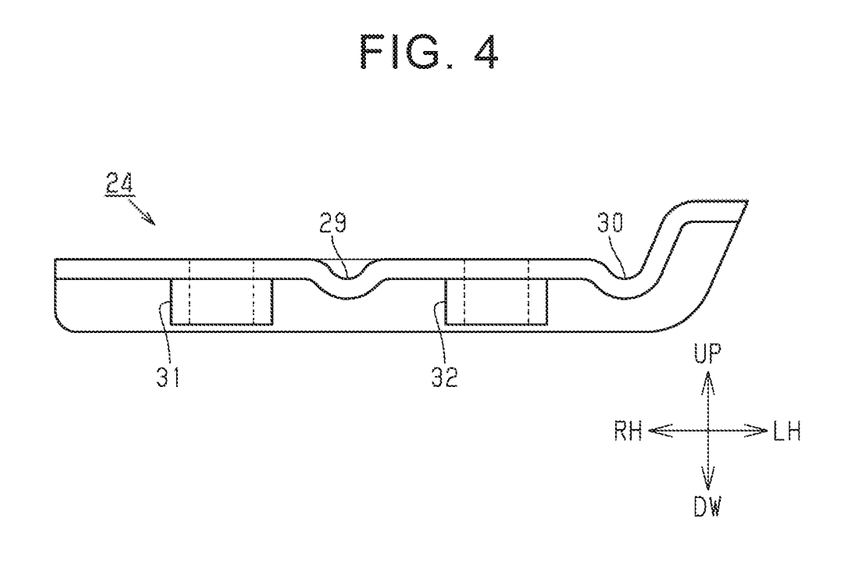
FIG. 4 is a front view of the bracket.

As shown in FIGS. 3 and 4, two recesses 29 and 30 each having a concave cylindrical surface shape are formed in an upper surface of the bracket 24 so as to extend in the front-back direction. The shape of a cross section perpendicular to the extending direction of each of the recesses 29 and 30 is a concave arc with a constant curvature. Further, nuts 31 and 32 each for fastening the bolt 21 are respectively provided at portions, rightward of the recesses 29 and 30, of the bracket 24.

As shown in FIG. 2, the body 23 of the has member 20 is formed with holes 33 and 34 respectively communicating with screw holes of the nuts 31 and 32. Therefore, in this battery carrier, the bolt 21 can be fastened to the nut 31 or 32 from above the base member 20.

A hole 35 is formed in the body 23 at its, portion right above the recess 29, while the recess 30 is formed on the bracket 24 at its portion protruding leftward from the body 23. Therefore, the two recesses 29 and 30 are each exposed at the upper surface of the base member 20. That is, in the battery carrier of this embodiment, the two recesses 29 and 30 each having the concave cylindrical shape are provided in the upper surface of the base member 20. In the base member 20 thus configured, the portion where the placement surface 25 is provided (the body 23) is made of a resin, while the portion where the recesses 29 and 30 are provided (the bracket 24) is made of a metal.

In the state of holding the small-size battery 10, the recess 29, located on the right side, of the two recesses is provided at a portion located sideward of the rib 12L of the left side surface 11L of the small-size battery 10. Likewise, in the state of holding the large-size battery 10, the recess 30, located on the left side, of the two recesses is provided at a portion located sideward of the rib 12L of the left side malice 11L of the large-size battery 10. The extending direction of the recesses 29 and 30 is parallel to an extending direction of the rib 12L of the left side surface 11L of the battery 10.

In the battery carrier of this embodiment, after placing the battery 10 on the placement surface 25, the clamp member 22 is fixed by the bolt 21 to an upper surface of the left-front side portion of the base member 20 with the bracket 24 attached. By tightening of the bolt 21, the ribs 12F and 12L, of the battery 10 are clamped between the clamp member 22 and the placement surface 25, so that the battery 10 is held to the base member 20.

Figure 5:
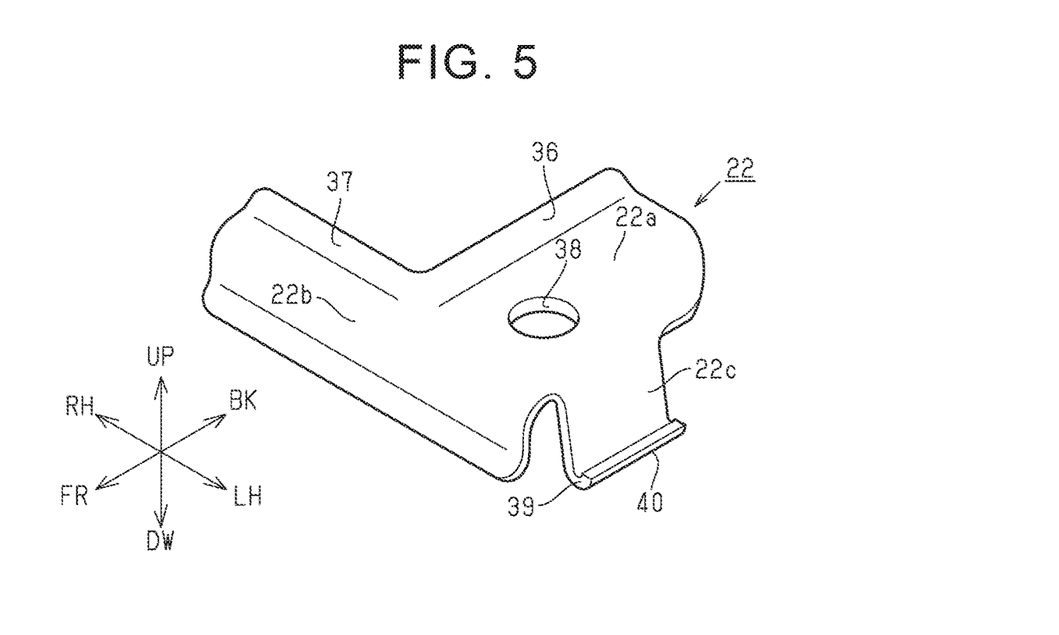
FIG. 5 is a perspective view of a clamp member as a constituent member of the battery carrier.

FIG. 5 shows a perspective structure of the clamp member 22. The clamp member 22 has an L-shaped portion that is composed of a rectangular portion 22a located leftward of the battery 10 in the holding state and a rectangular portion 22b located forward of the battery 10 in the holding state. Further, the clamp member 22 has a portion 22c protruding left-downward from the portion 22a.

In the battery 10 holding state, an end portion on the right side of the portion 22a serves as a first clamp portion 36 that comes in contact with the upper surface of the rib 12L provided at the left side surface 11L of the battery 10. Likewise, in the battery 10 holding state, an end portion on the back side of the portion 22b serves as a second clamp portion 37 that comes in contact with the upper surface of the rib 12F provided at the front side surface 11F of the battery 10.

On the other hand, a bolt hole 38 through which the bolt 21 for fixing the clamp member 22 to the base member 20 is inserted is formed in the portion 22a at its portion leftward of the first clamp portion 36. Further, in the battery 10 holding state, an end portion on the left side of the portion 22c serves as a fulcrum portion 39 that comes in contact with the base member 20. The fulcrum portion 39 is curved with a constant curvature, and its curved outer surface serves as a convex cylindrical surface 30 that comes in contact with the recess 29 or 30. The curvature of the convex cylindrical surface 40 is set to be equal to the curvature of the concave cylindrical surface of each of the recesses 29 and 30.

Subsequently, the operation of the battery carrier configured as described above will be described. Holding of the battery 10 by the battery carrier of this embodiment is started by placing the battery 10 on the placement surface 25 of the base member 20 in a state where the bolt 21 and the clamp member 22 are detached from the base member 20. The placement of the battery 10 on the placement surface 25 is carried out such that the upper surface of the rib 12R of the right side surface 11R comes into abutment with the lower surface of the locking portion 27 provided to the right side wall 26R of the base member 20 and that the upper surface of the rib 12B of the back side surface 11B comes into abutment with the lower surface of the locking portion 28 provided to the back side wall 26B of the base member 20. By the abutment with the locking portions 27 and 28 in this event, the rib 12R and the rib 12B of the right side surface 11R and the hack side surface 11B of the battery 10 are respectively locked to the right side wall 26R and the hack side wall 26B of the base member 20.

The position of the battery 10 on the placement surface 25 determined by the abutment between the ribs 12R and 12B and the locking portions 27 and 28 in this event. That is, the position of the battery 10 in the left right direction on the placement surface 25 is determined by the abutment of the rib 12R with the locking portion 27, while the position of the battery 10 in the front-back direction on the placement surface 25 is determined by the abutment of the rib 12B with the locking portion 28. In this way, in the battery carrier of this embodiment, the battery 10 is placed on the placement surface 25 such that the positions, on the placement surface 25, of the right side surface 11R (a side surface located on a side opposite to the left side surface 11L) and the back side surface 11 provided with the ribs 12R and 12B that are locked by the locking portions 27 and 28 are respectively located at prescribed positions.

After placing the battery 10 in this way, the clamp member 22 is fixed to the base member 20 by the bolt 21. By clamping the ribs 12L and 12F of the left side surface 11L and the front side surface 11F of the battery 10 between the first and second clamp portions 36 and 37 of the clamp member 22 and the placement surface 25, the battery 10 is held by the battery carrier.

As described above, the battery carrier of this embodiment is configured to deal with batteries of two sizes with different widths in the left-right direction as holding objects. In the battery carrier of this embodiment, by changing the fixing position of the clamp member 22 on the base member 20 according to the size of the battery to be held, it is possible to hold either one of the batteries of small and large two sizes.

Figure 6:
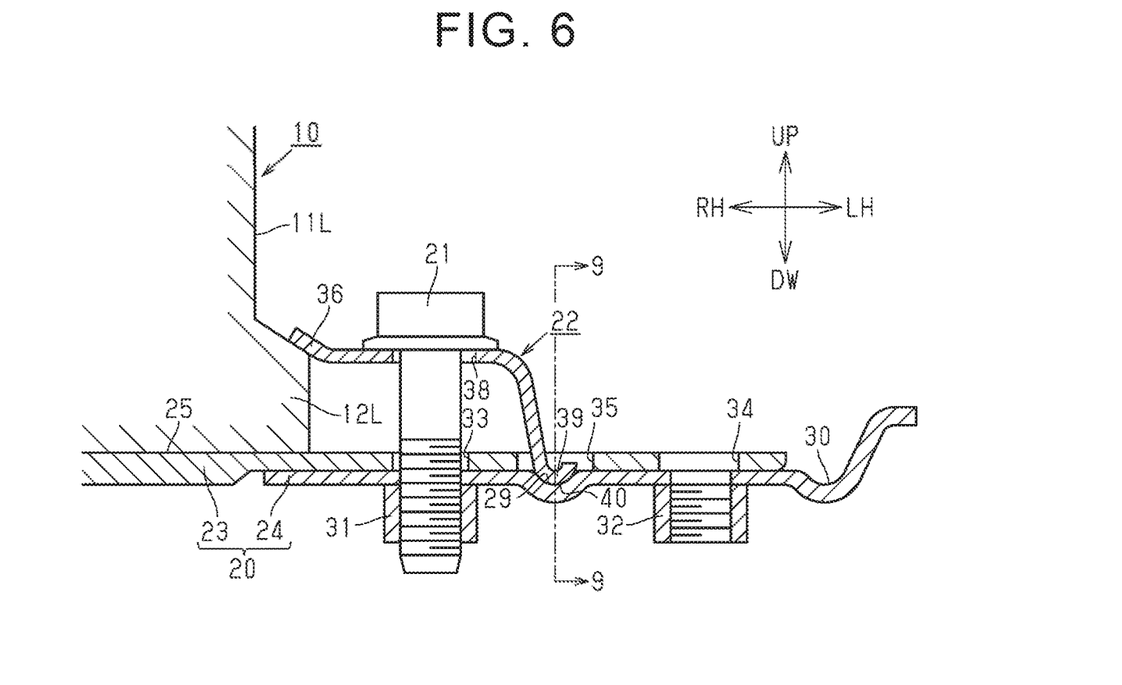
FIG. 6 is a sectional view of a portion around the clamp member when the battery carrier holds a small-size battery.

As shown in FIG. 6, when holding the small-size battery 10, the clamp member 22 is disposed at the position such that the convex cylindrical surface 40 of the fulcrum portion 39 comes in contact with the right-side recess 29 of the two recesses 79 and 30 provided to the base member 20. In this event, the bolt 21 is fastened to the right-side nut 31 of the two nuts 31 and 32 provided to the base member 20 in the state where the bolt 21 is inserted through, the bolt hole 38 of the clamp member 22.

Figure 7:
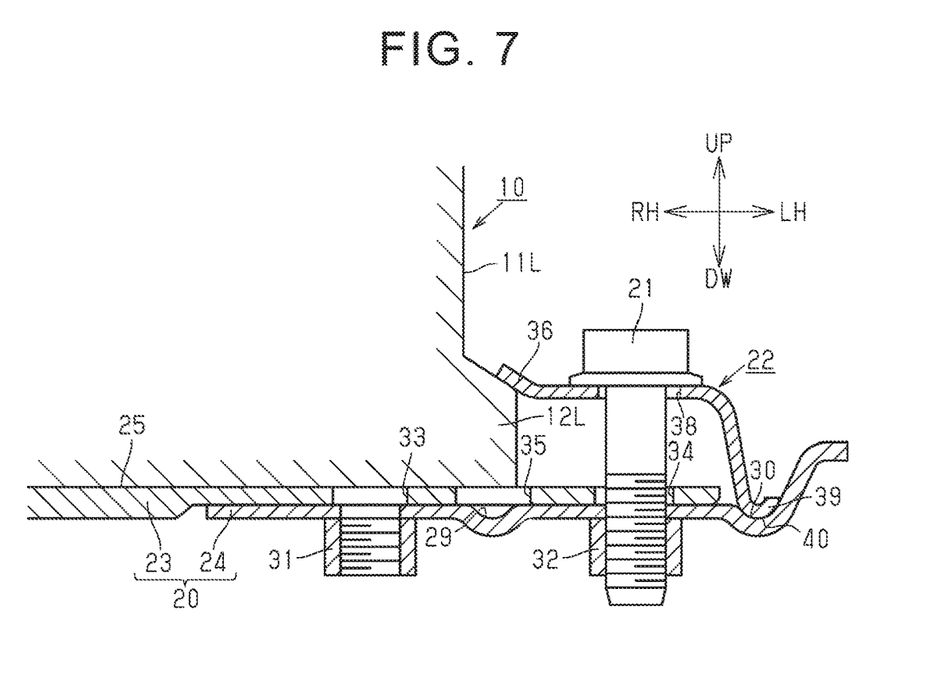
FIG. 7 is a sectional view of a portion around the clamp member when the battery carrier holds a large-size battery.

As shown in FIG. 7, when holding the large-size battery 10, the clamp member 22 is disposed at the position such that the convex cylindrical surface 40 of the fulcrum portion 39 comes in contact with the left-side recess 30 of the two recesses 29 and 30. In this event, the bolt 21 is fastened to the left-side nut 32 of the two nuts 31 and 32 in the state where the bolt 21 is inserted through the bolt hole 38 of the clamp member 22. FIGS. 6 and 7 each show a section, in which a section of the bracket 24 taken along line 7-7 of FIG. 3 is located, of the battery carrier.

As described above, the battery 10 is placed on the placement surface 25 such that the position, on the placement surface 25, of the right side surface 11R is located at the prescribed position, and therefore, the position, on the placement surface 25, of the rib 12L that is clamped by the first clamp portion 36 of the clamp member 22 changes according to the width of the battery 10 in the left-right direction. On the other hand, the two recesses 29 and 30 are provided in the upper surface of the base member 20 at positions with different distances from the prescribed position at which the right side surface 11R is located. Likewise, the two nuts 31 and 32 are provided to the base member 20 at positions with different distances from such a prescribed position. Therefore, in the battery carrier of this embodiment, even if the position of the rib 12L on the placement surface 25 changes due to the difference in width of the batteries 10 in the left-right direction, it is possible to change the fixing position of the clamp member 22 on the base member 20 according to the position of the rib 12L.

Figure 8:
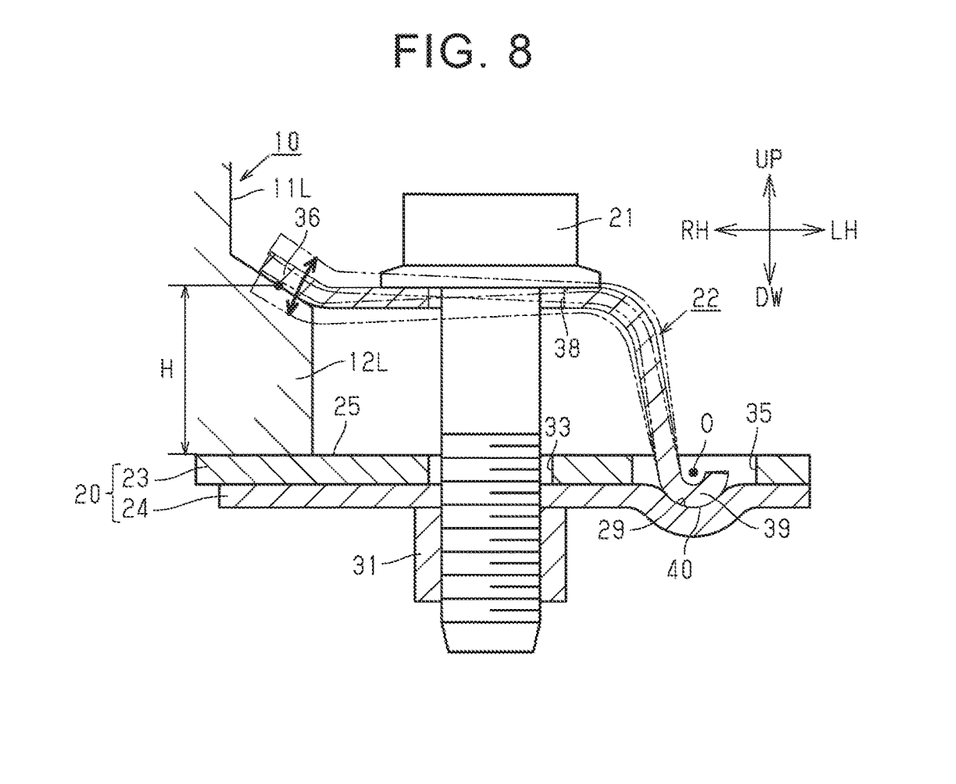
FIG. 8 is a sectional view showing a manner of changing the clamp height of the battery carrier.

As shown in FIG. 8, in the battery 10 holding state, the clamp member 22 is disposed such that the convex cylindrical surface 40 of the fulcrum portion 39 comes in contact with the recess 29 (30) of the concave cylindrical surface shape provided in the upper surface of the base member 20. As described above, the curvature of the convex cylindrical surface 40 of the fulcrum portion 39 is set to be equal to the curvature of the concave cylindrical surface of the recess 29 (30). The clamp member 22 disposed on the base member 20 in this state is pivotable about a cylinder center axis O of the convex and concave cylindrical surfaces while maintaining the contact between the fulcrum portion 39 and the recess 29 (30) at the convex and concave cylindrical surfaces. Then, when the clamp member 22 pivots in this way, the height (clamp height H) from the placement surface 25 to the first clamp portion 36 and the second clamp portion 37 changes.

There is variation, due to the manufacturing tolerance, in heights (rib heights) of the ribs 12L and 12F that come in contact with the first clamp portion 36 and the second clamp portion 37 in the battery 10 holding state. Further, when holding of the battery 10 spans a long period of time, the upper surfaces of the ribs 12L and 12F may be subjected to creep deformation due to pressing by the clamp member 22, leading to change in the rib height. Further, the material of the ribs 12L and 12F may be degraded due to repetition of thermal expansion and thermal contraction according to changes in the ambient temperature, and so on, leading to change in the rib height. Further, the respective portions of the base members 20 and the clamp members 22 are also subjected to variation in dimensions due to the manufacturing tolerance and to temporal dimensional changes. The rib height referred therein is the height from the placement surface 25 to the ribs 12L and 12F in the state where the battery 10 is placed on the placement surface 25.

In this regard, in the battery carrier of this embodiment, such dimensional differences can be absorbed through the change in the clamp height H by pivoting of the clamp member 22 about the cylinder center axis O of the fulcrum portion 39 and the recess 29 (30). The pivoting of the clamp member 22 in this event is carried out while maintaining the contact between the convex and concave cylindrical surfaces without causing a change in the contact area therebetween. Further, the change in the clamp height H by the pivoting of the clamp member 22 in this event does not cause elastic deformation of the clamp member 22.

In contrast, in the case where the change in the clamp height H causes elastic deformation a the chimp member 22, the clamp member 22 may already be in a distorted state due to the elastic deformation when the first clamp portion 36 and the second clamp portion 37 come in contact with the upper surfaces of the ribs 12L and 12F. In this case, by tightening of the bolt 21 to generate clamping force for the ribs 12L and 12F, the clamp member 22 is further distorted. Since elastic reaction force of the clamp member 22 that is generated against the distortion becomes large, the surface pressure that is applied to a contact surface (hereinafter referred to as a "support surface"), with the fulcrum portion 39 of the clamp member 22, of the base member 20 also becomes large. Therefore, creep deformation is likely to occur in the clamp member 22 and the support surface of the base member 20.

On the other hand, in the case where the change in the clamp height H causes a change in the contact area between the fulcrum portion 39 of the clamp member 22 and the support surface of the base member 20, when the contact area therebetween decreases, the surface pressure that is applied to the support surface due to pressing by the fulcrum portion 39 according to tightening of the bolt 21 increases. As a result, creep deformation is likely to occur in the support surface of the base member 20.

Such creep deformation loosens the tightening of the bolt 21, leading to a decrease in the damping force for, the ribs 12L and 12F and thus to a decrease in the holding force for the battery 10. Therefore, in the case where the change in the clamp height H causes the elastic deformation of the clamp member 22 or the change in the contact area between the fulcrum portion 39 of the clamp member 22 and the support surface of the base member 20, there is a possibility that the change in the clamp height H may promote a decrease with, time in the holding force for the battery 10. In this regard, as described above, in the battery carrier of this embodiment, it is possible to change the clamp height H without causing the elastic deformation of the clamp member 22 or the change in the contact area, i.e. without promoting the decrease with, time in the holding force for the battery 10.

In the battery carrier thus configured, battery fluid may leak out of the battery 10 that is being held. On the other hand, in this battery carrier, the recess 29 of the concave cylindrical shape that serves as the support surface for the fulcrum portion 39 of the clamp member 22 is provided in the upper surface of the base member 20, so if the battery fluid leaking out to the placement surface 25 continues to accumulate in the recess 29, there is a possibility that the metal bracket 24 formed with the recess 29 may be corroded.

Figure 9:
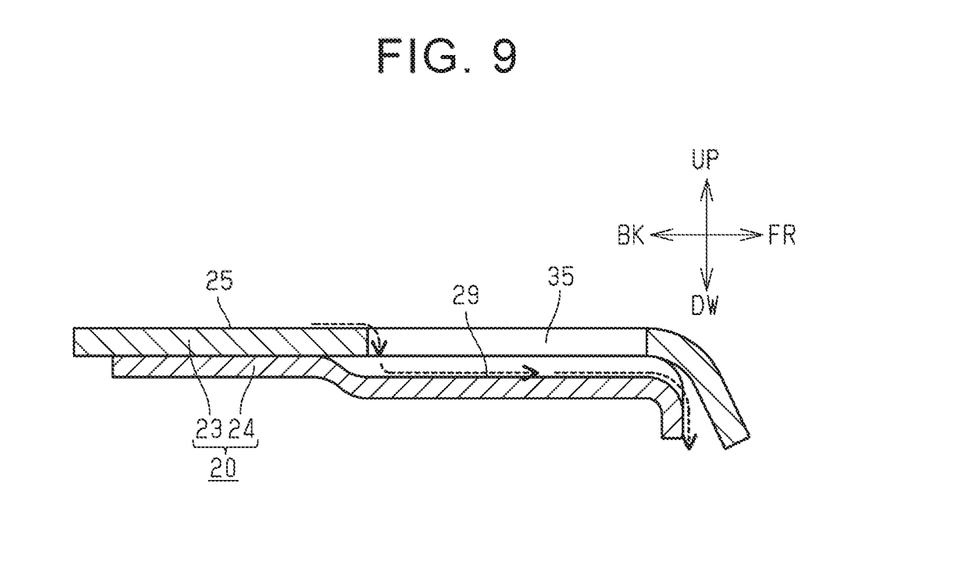
FIG. 9 is a sectional view, taken along line 9-9 of FIG. 6, showing a portion around a recess of the battery carrier.

As shown in FIG. 9, in the battery carrier of this embodiment, the recess 29 extends to a front end of the bracket 24 and is opened at the front end. Therefore, as indicated by dotted-line arrows in FIG. 9, the battery fluid flowing into the recess 29 flows along the inside of the recess 29 and is discharged to the outside, from its front end.

According to the battery carrier of this embodiment described above, the following effects can be obtained. (1) In the battery carrier of this embodiment, the contact surfaces between the base member 20 and the clamp member 22 are the concave and convex cylindrical surfaces, and it is possible to change the clamp height, H by pivoting of the clamp member 22 about the cylinder center axis of those cylindrical surfaces. By changing the clamp height H, it is possible to absorb variation in dimensions of the batteries 10, the base members 20, the clamp members 22, and so on in the manufacture and temporal dimensional changes thereof. Therefore, it is possible to reliably ensure the holding force for the battery 10 regardless of variation in dimensions of the members.

(2) It is possible to change the clamp height H without causing elastic deformation of the clamp member 22 or a change in the contact area between the base member 20 and the clamp member 22. Therefore, it is possible to suppress creep deformation of the clamp member 22 and the base member 20 that causes a decrease in the holding force for the battery 10.

(3) In the base member 20, the portion where the placement surface 25 is provided (the body 23) is made of a resin, while the portion where the recesses 29 and 30 are provided (the bracket 24) is made of a metal. An increase in the holding force for the battery 10 by the clamp member 22 should be limited to a range in which the surface pressure that is applied, to the recess 29, 30 does not generate creep, deformation of the recess 29, 30. Therefore, if the recesses 29 and 30 are made of the metal having a higher creep resistance than the resin, the holding force for the battery 10 can be made greater. In addition, if the placement surface 25 and so on are made of the resin having a lower specific gravity than the metal, it is possible to increase the battery holding force while suppressing, an increase in the weight of the battery carrier.

(4) By providing the two recesses 29 and 30 and the two nuts 31 and 32, the fixing position of the clamp member 22 on the base member 20 can be changed. Therefore, it is possible to hold either one of the two kinds of the batteries 10 of different sizes.

(5) Since the clamp member 22 is in the form of a plate member that is curved in a semi-cylindrical shape at the fulcrum portion 39, the clamp member 22 can be easily manufactured by press working or the like. (6) Since the recess 29 extends to the from end of the bracket 24 and is opened to the outside, at the front end, it is suppressed that the battery fluid leaking out of the battery 10 accumulates, in the recess 29 to corrode the bracket 24.

(7) Since the fulcrum portion 39 of the clamp member 22 has a cylindrically rounded shape, even if the fulcrum portion 39 hits the surface of the bracket 24 when fixing the clamp member 22, the surface of the bracket 24 is unlikely to be cracked, so that the progress of corrosion from a crack can be suppressed.

The above-described embodiment vim also be carried out with the following changes. In the above-described embodiment, the contact surfaces between the base member 20 and the clamp member 22 are the concave and convex cylindrical surfaces having the same curvature. Since pressing caused by tightening of the bolt 21 is applied to these contact surfaces, even if the curvatures of the contact surfaces slightly differ from each other, the contact surfaces come into surface contact with each other by elastic deformation, so that the clamp height H can be changed without changing the contact area therebetween. Therefore, the curvature of the convex cylindrical surface 40 of the fulcrum portion 39 and the curvature of the concave cylindrical surface of the recess 29, 30 may be set to be different from each other within a range in which the clamp height H can be changed without changing the contact area therebetween.

In the above-described embodiment, the recesses 29 and 30 are each formed such that the shape of its cross section perpendicular to its extending direction is a concave arc with a constant curvature. Even if this cross section is shaped to have a gradually changing curvature, the contact surfaces can be brought into contact with each other by elastic deformation. Therefore, the convex cylindrical surface 40 of the fulcrum portion 39 and the concave cylindrical surfaces of the recesses 29 and 30 each may be a surface having an approximately constant curvature.

In the above-described embodiment, the clamp member 22 is provided with the two clamp portions, i.e. the first clamp portion 36 that clamps the rib 12L of the left side surface 11L of the battery 10, and the second clamp portion 37 that clamps the rib 12F of the from side surface 11F of the battery 10. Of these two clamp portions, the second clamp portion 37 may be omitted.

In the above-described embodiment, the nuts 31 and 32 are fixed to the bracket 24. However, the nuts 31 and 33 may be provided so as to be detachable from the bracket 24. Alternatively, it may be configured that a nut is provided to the clamp member 22 and that the bolt 21 is inserted from below the base member 20 so as to be fastened to the nut, or it may be configured that a bolt is fixed to the base member 20 and then inserted through the bolt hole 38 and that a nut is fastened to the bolt from above the clamp member 22.

In the above-described embodiment, holding of the two kinds of the batteries 10 of different sizes is made possible by providing the two recesses 29 and 30. Three or more recesses may be provided to make, it possible to hold three or more kinds of batteries with different sizes. If it is sufficient that only a single-size battery can be held, only one recess may be provided.

In the above-described embodiment, the recesses 29 and 30 are provided to the metal bracket 241. However, if the surface pressure that is applied to the recess 29, 30 in the battery 10 holding state is of a degree that is bearable even by a resin, the base member 20 in its entirety may be made of the resin. Alternatively, if an increase in the weight of the battery carrier can be allowed, the base member 20 in its entirety may be made of a metal.

What is claimed is:

1. A battery carrier that holds in a vehicle a battery having a rectangular parallelepiped shape and provided with a rib at a bottom portion of a side surface of the battery, the battery carrier comprising:
    a base member having, at its upper surface, a placement surface on which the battery is placed in a holding state in which the battery carrier holds the battery, the base member having a recess of a concave cylindrical shape, the recess being provided at a portion of the upper surface located sideward of the rib in the holding state, and the recess extending in a direction parallel to an extending direction of the rib;
    a clamp member that clamps and holds the rib between the clamp member and the placement surface in the holding state, the clamp member including a clamp portion that is in contact with an upper surface of the rib in the holding state, a fulcrum portion having a convex cylindrical surface, that is in contact with the recess, as a contact surface of the clamp member with the base member in the holding state, and a bolt hole provided at a portion between the clamp portion and the fulcrum portion, the fulcrum portion being on an opposite side of the clamp member from the clamp portion; and
    a bolt that is inserted through the bolt hole in the holding state, wherein
    the base member and the clamp member are configured to generate, by fastening the bolt, a clamping force with which the rib is clamped between the clamp portion and the placement surface, and
    the fulcrum portion is located below the clamp portion.

2. The battery carrier according to claim 1, wherein the base member is made of a resin at a portion where the placement surface is provided, and is made of a metal at a portion where the recess is provided.

3. The battery carrier according to claim 1, wherein in the holding state, the battery is placed on the placement surface such that a position, on the placement surface, of a side surface located on a side opposite to the side surface where the rib clamped by the clamp member is provided is located at a prescribed position, and
    a plurality of the recesses are provided in the upper surface of the base member at positions with different distances from the prescribed position.

4. The battery carrier according to claim 1, wherein the clamp member is in a form of a plate member in which the fulcrum portion is curved with the same curvature as the recess.

5. The battery carrier according to claim 1, wherein the clamp member is configured to be able to change a height from the placement surface to the clamp portion by pivoting about a center axis of the fulcrum portion while maintaining contact between the fulcrum portion and the recess.

6. The battery carrier according to claim 1, wherein the upper surface of the rib is inclined downward as it extends sideward of the rib.

7. The battery carrier according to claim 1, wherein the battery further includes a rib at a side surface that is adjacent to the side surface where the rib clamped by the clamp member in the holding state is provided, and
    the clamp member further includes a clamp portion that comes in contact with an upper surface of the rib provided at the adjacent side surface.

8. The battery carrier according to claim 2, wherein the base member includes a resin body and a metal bracket formed with the recess, and
    the metal bracket is provided with a nut for fastening the bolt.

9. The battery carrier according to claim 8, wherein the recess extends to one end of the metal bracket and is opened at the one end.

10. A battery carrier that holds in a vehicle a battery having a rectangular parallelepiped shape and provided with a rib at a bottom portion of a side surface of the battery, the battery carrier comprising:
    a base member having, at its upper surface, a placement surface on which the battery is placed in a holding state in which the battery carrier holds the battery, the base member having a recess of a concave cylindrical shape, the recess being provided at a portion of the upper surface located sideward of the rib in the holding state, and the recess extending in a direction parallel to an extending direction of the rib;
    a clamp member that clamps and holds the rib between the clamp member and the placement surface in the holding state, the clamp member including a clamp portion that is in contact with an upper surface of the rib in the holding state, a fulcrum portion having a convex cylindrical surface, that is in contact with the recess, as a contact surface of the clamp member with the base member in the holding state, and a bolt hole provided at a portion between the clamp portion and the fulcrum portion, the fulcrum portion being on an opposite side of the clamp member from the clamp portion; and a bolt that is inserted through the bolt hole in the holding state, wherein the base member and the clamp member are configured to generate, by fastening the bolt, a clamping force with which the rib is clamped between the clamp portion and the placement surface, the clamp portion is a first clamp portion and the clamp member includes a second clamp portion, the clamp member includes an L-shaped portion including a first rectangular portion and a second rectangular portion, the first rectangular portion includes the first clamp portion and the second rectangular portion includes the second clamp portion, and the fulcrum portion extends downward from the L-shaped portion.

* * * * *